United States Patent [19]

Lechner et al.

[11] Patent Number: 4,968,560

[45] Date of Patent: Nov. 6, 1990

[54] FIBER-REINFORCED EPOXIDE RESINS

[75] Inventors: Ulrike Lechner, Offenbach; Albrecht Feldsmann, Wiesbaden, both of Fed. Rep. of Germany

[73] Assignee: Degussa Aktiengesellschaft, Frankfurt am Main, Fed. Rep. of Germany

[21] Appl. No.: 363,170

[22] Filed: Jun. 8, 1989

[30] Foreign Application Priority Data

Jun. 22, 1988 [DE] Fed. Rep. of Germany ....... 3820971

[51] Int. Cl.$^5$ .............................................. B23B 27/34
[52] U.S. Cl. .................................... 428/391; 428/378; 523/212; 523/213

[58] Field of Search ................ 428/391, 378; 106/481; 523/212, 213

[56] References Cited

U.S. PATENT DOCUMENTS 4,309,478  1/1982  Huber et al. ......................... 428/391
4,842,934  6/1989  Cordova et al. ..................... 428/391

Primary Examiner—Lewis T. Jacobs
Attorney, Agent, or Firm—Cushman, Darby & Cushman

[57] ABSTRACT

Epoxide resins which are reinforced with aramid fibers and in which the adhesion between fibers and resin is improved by means of a pretreatment of the fibers with organosilanes.

2 Claims, No Drawings

FIBER-REINFORCED EPOXIDE RESINS

The present invention relates to aramid-fiber-reinforced epoxide resins which have improved adhesion between the fibers and the epoxide resin and to surface-treated aramid fibers for use in such products.

BACKGROUND OF THE INVENTION

The adhesion in composite fiber materials in the boundary surface between fiber and matrix constitutes a major problem because it clearly influences the mechanical properties of the composite's fiber components. The boundary surface must receive and transfer both all of the external forces applied to the composite and also the internal forces which are produced by different thermal coefficients of expansion and by hardening shrinkage. Frequently, adhesive agents are used, e.g. on glass fibers, to improve the adhesive quality and the mechanical properties between the fiber surface and the resin. In the past, no effective means were known for improving the adhesion of aramid fibers.

SUMMARY OF THE INVENTION

The object of the present invention is to provide aramid-fiber-reinforced epoxide resins in which the adhesion between fiber and epoxide resin is improved.

In accordance with the invention, these and other objects are achieved in aramid-fiber-reinforced epoxide resins in which the surfaces of the aramid fibers are treated with an organosilane of the general formula:

| | |
|---|---|
| $R^1-(CH_2)_n-Si(OR)_3$ | (I) or |
| $S_x[(CH_2)_n-Si(OR)_3]_2$ | (II) | in which $R^1$ is halogen or an organic group selected from the group consisting of alkyl, alkenyl, amino, mercapto, acetoxy, epoxy, methacryloxy or N'-acyl urea which is bound to the silicon atom by an alkyl chain having 2 to 6 carbon atoms, R is an alkyl group having 1 to 4 carbon atoms, especially methyl or ethyl and x corresponds to a number from 1 to 6, preferably 1 to 4.

$R^1$ advantageously signifies:
Halogen: Chlorine,
Alkyl: Methyl or ethyl with n=2,
Alkenyl: Vinylene, 2-propenyl, cyclohexenyl
N'-acyl urea of the formula:

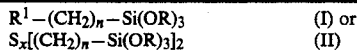

where $R^2$ is straight-chain or branched-chain alkyl containing 1 to 6 carbon atoms,
$R^3$ is hydrogen, straight-chain or branched chain alkyl containing 1 to 6 carbon atoms, (2 methoxy)ethyl, aryl (especially phenyl) or

where y=1, 2 or 3 and D is $-CH_2-$ or $NR^2$, compounds like those which can be prepared according to German Patent Specification DE-OS 35 24 215.9.

Preferred sulfur-functional organosilanes according to Formula (II) are in particular compounds with x=1 to 4 and n=3, especially

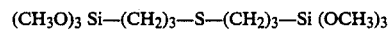

Higher molecular weight substances which contain on the average more than one epoxide group per molecule are designated as epoxy resins useful for the manufacture of composites in accordance with the invention. This functional group is reacted with reactive hydrogen atoms of other compounds such as e.g. multivalent alcohols, polybasic acids and acid anhydrides or polyfunctional amines. Resins containing epoxide groups react with the above-mentioned compounds in polyaddition reactions. Cross-linked, non-meltable products, so-called duroplasts, are then obtained.

However, the reactions of the epoxide resins are not limited to additions on the oxirane ring. The resins can also polymerize in a ring-opening manner or e.g. be esterified with fatty acids.

The attachment or addition of active hydrogen compounds such as e.g. to an amine takes place with formation of hydroxyamines. The resin systems L 20 and SL used in the examples consists of a low-viscosity, fully reactive Bisphenol A resin and an aliphatic diamine hardener and is very well suited for the preparation of highly loaded compound components. In conjunction with the hardeners of the SL series, the resin can be adapted as desired with regard to pot life and viscosity.

The invention also comprises a method for the surface treatment of aramid fibers in which the aramid fiber fabric is immersed at 5° to 40° C., preferably 20° to 25° C., into an organic solvent containing 0.01 to 10, preferably 0.01 to 1% by weight of an organosilane according to Formula (I) or (II) relative to the total amount of the solution. Suitable solvents are polar compounds such as e.g. water or alcohols, especially methanol, ethanol, petroleum ether, isopropanol, gasoline, benzene.

After an immersion time of 1 to 120 minutes, the fabric is allowed to predry, generally at room temperature or at elevated temperatures up to 70° C., followed by a treatment at 60° to 120° C., advantageously for 0.1 to 15 hours.

The present invention also comprises aramid fibers obtained in the manner just described, which have an organosilane content of 0.01 to 10, especially 0.01 to 1.0% by weight relative to the weight of the treated fiber.

The percentage by weight of the fibers in the reinforced epoxide resin is as high as 40 to 60%, preferably 50 to 51% by weight.

It was surprisingly found that the pretreatment of aramid fibers with organosilanes in accordance with the invention produces an improvement of the adhesion to epoxide resins. This was demonstrated in bending tests and peeling tests by means of a drum both after dry storage and after wet storage.

This was not to be expected since, in contrast to glass fibers, whose adhesion in plastics has long been improved with organosilanes, aramid fibers exhibit no OH-functional groups on their solid surfaces due to their chemical composition and thus no siloxane bond should be created between the aramid fiber and organosilane.

DETAILED DESCRIPTION OF PREFERRED EMBODIMENTS

The following experiments illustrate the invention:
Materials used:

Aramid Fiber Fabric (from the Firm Interglas/Ulm)

TABLE 1

| Quality | 98610 |
|---|---|
| Weight (g/m) ± 5% | 170 |
| Thread count/cm | 20 × 20 |
| Warp material tex | 42 |
| Woof material tex | 42 |
| Thickness (mm) DIN 53855 | 0.35 |
| weave | Atlas 1/7 |

TABLE 2

| Qualities | Units | Value |
|---|---|---|
| Resin L 20 | | |
| Density 20° C. | g/cm$^3$ | 1.15 ± 0.01 |
| Viscosity 25° C. | mPa × sec | 900 +/− 150 |
| Epoxide equivalent | g/equiv. | 179 ± 4 |
| Hardener SL | | |
| Density 20° C. | g/cm$^3$ | 0.95 ± 0.02 |
| Viscosity 25° C. | mPa × sec | 85 ± 10 |
| Amine equivalent | g/equiv. | 60 |
| Mixing ratio | GT | 34 |
| at 100 GT L 20 | | |

Organosilanes used:

TABLE 3

| Code | Structural formula |
|---|---|
| A (1 or 2)* | $(CH_3O)_3$—Si—$CH_2$—$CH_2$—$CH_3$ |
| B | $(CH_3O)_3$—Si—$CH_2$—$CH_2$—CH=$CH_2$ |
| C | $(CH_3O)_3$—Si—$CH_2$—$CH_2$— |
| D | $(CH_3O)_3$—Si—$CH_2$—$CH_2$—$CH_2$—Cl |
| E | $(CH_3O)_3$—Si—$CH_2$—$CH_2$—CH$\underset{O}{\overset{\diagdown\,\diagup}{\text{———}}}$CH$_2$ |
| F | $(CH_3O)_3$—Si—$CH_2$—$CH_2$— |
| G | $(CH_3O)_3$—Si—$CH_2$—$CH_2$—NH—CO—$(CH_2)_5$ |
| H | $((CH_3O)_3$—Si—$CH_2$—$CH_2$—$CH_2)_2$—S |
| I (1 or 2* | $(CH_3$—$CH_2O)_3$—Si$CH_2$—$CH_2$—$CH_2$—$NH_2$ |

Note: the designation 1 in the above table indicates that the solvent was petroleum ether and the designation 2 indicates that the solvent was water. No designation indicates that the solvent was petroleum ether

TEST PROCEDURE

Application of the Silane

The untreated fabrics were cut to size with a special pair of shears to the required measures, which depend on the size of the standard specimen and the specimen number. Care was taken that the extended threads ran on the surface of the fabric in the longitudinal direction of the specimen. Subsequently, a 0.5 % silane solution was prepared in water or petroleum ether (see Tables 4 and 5). The fabric sample was immersed for 30 min. in the solution and then the sample was dried for 80 min. at a room temperature of 22° C. and 63% rel. humidity as well as for 120 min. in a thermal recirculated-air oven at 120° C.

The silanized fabric was placed during the first drying phase on an absorbent paper.

Test Specimens

The strength test comprised test specimens which (a) were stored at room temperature at 22° C. and 63% rel. moisture (dry storage) and (b) test specimens which had been boiled for 2 hours at 100° C. in distilled water (wet storage). These wet-stored test specimens were dried before the test on absorbent paper, cooled down to room temperature and tested immediately thereafter.

The epoxide resin and the hardener were prepared in a mixing ratio of 100:34 (parts by weight). The percentage by weight of the fibers in the reinforced resin was 50.5 % by weight.

Drum Peeling Test (According to DIN 53295)

The dimensions of the test plates were 280 x 320 x 2 (mm). It was possible to cut 4 test specimens out of the test plate, which were stored at room temperature. The laminates hardened in a press under the following conditions:
Prehardening: 70° C./2 hours
Tempering: 120° C./8 hours A distance range assured a uniform laminate thickness of 2 mm during pressing.

Since the laminate experiences a bending stress from the roller during the peeling test, it was adhered for stiffening with the resin - hardener system L 20 VE 2778 onto an 8 mm thick aluminum plate and hardened under the following conditions;
Prehardening: 25° C./3 hours
Tempering: 60° C./15 hours The aluminum sheets had been previously heated to 30° C. in order to avoid tensions in the adhesive surface which occur later during the tempering cycle. These undesired tensions are caused by the different coefficients of heat expansion of aluminum and of the resin system.

TABLE 4

Peeling moment (M) determined by a drum peeling test (after dry storage)

| Silane | Peeling moment M (N* mm/mm) | Improvement (%) |
|---|---|---|
| 0 | 133.8 | |
| A$_1$ | 159.6 | 19.2 |
| B | 177.6 | 32.7 |
| C | 185.4 | 38.5 |
| D | 177.6 | 32.7 |
| E | 140.4 | 4.9 |
| F | 156.6 | 17.0 |
| I$_2$ | 138.0 | 3.2 |

Bending Test (According to DIN 53 542)

The standard test specimen has the dimensions 80 x 10 x 4 (mm). The dimensions 180 x 150 x 4 (mm) result therefrom, taking into consideration the number of test specimens, the edge trimming and the cutting break for the test plate. The test plate contained 6 test specimens for dry storage and for wet storage at a time. The test procedure corresponded to DIN 53452 and was carried out at a room temperature of 22° C. and 63% rel. moisture. The test specimens were cut out of the test plates. All cutting surfaces exhibited a surface free of scoring.

TABLE 5

Measured values of the bending stress

| Silane | Dry storage | | Wet storage | |
|---|---|---|---|---|
| | Bending stress (N/mm$^2$) | Improvement (%) | Bending stress (N/mm$^2$) | Improvement (%) |
| 0 | 364.5 | | 321.4 | |
| A$_1$ | 404.5 | 11.0 | 370.1 | 15.2 |
| A$_2$ | 370.1 | 1.5 | 337.8 | 5.1 |
| B | 387.6 | 6.3 | 358.2 | 11.4 |
| C | 407.7 | 11.9 | 382.9 | 19.1 |
| D | 397.7 | 9.1 | 383.7 | 19.4 |
| E | 351.3 | −3.5 | 340.5 | 5.9 |
| F | 407.3 | 11.7 | 387.9 | 20.7 |
| G | 379.0 | 4.0 | 355.6 | 10.6 |
| H | 385.6 | 5.7 | 356.7 | 10.9 |
| I$_1$ | 362.4 | −0.6 | 374.3 | 16.4 |
| I$_2$ | 401.7 | 10.2 | 373.1 | 16.1 |

Traction Test (According to DIN 53455)

The test plate contained 4 test specimens for a dry storage in each instance. The test plate size was 180 x 75 x 2 (mm). The test specimens with the dimensions 170 x 15 x 2 (mm) were separated out of the test plates. Moreover, the reinforcements of glass-fiber-reinforced plastic (GFK) with the dimensions 35 x 15 x 1 (mm) were adhered on both sides on the upper and the lower edge of the aramid laminate. (Resin - hardener system: L 20 VE2778 hardening: 60° C./15 hours). This resulted in a test length of 100 mm. The GFK reinforcements were chamfered on one side in order to assure a more uniform introduction of force.

TABLE 6

Values for tensile force and tensile stress determined by traction test

| Silane | Traction force (N) | Tensile stress (N/mm$^2$) |
|---|---|---|
| O | 18000 | 488 |
| A$_2$ | 18600 | 534 |
| F | 18000 | 499 |
| G | 18300 | 527 |

The new generation of fibers, aramid fibers, designated Kevlar(®) or Twaron (®) were developed by DuPont and Akzo. They show high modulus, high tensile strength and high stability. By 1965, these fibers were beiing spun from the para-oriented aromatic polyamides ("paraaramids") such as poly(p-benzamide) ("PBA"), poly(p-phenylene terephthalamide) ("PPD-T"), and poly(4,4'-diaminobenzanilide terephthalamide) ("4,4'-DABT"). These three structurally, functionally, and chemically similar para-aramids are made of chains of the following units:

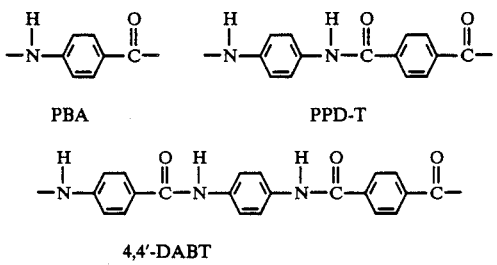

PBA    PPD-T 4,4'-DABT

As can be appreciated from their structural formulae, the polymers PBA and PPD-T are analogs of one another, and 4,4'-DABT is a copolymer comprising the PBA and PPD-T units. As expected, the paraaramids yielded yet stronger fibers as a result of their greater stiffness over the corresponding meta-aramids.

What is claimed is:

1. Aramid fibers for reinforcing epoxide resins which have been pretreated on the surface with an organosilane of the general formula $$R^1-(CH_2)_n-Si(OR)_3 \quad (I)$$
or
$$S_x[(CH_2)_n-Si(OR)_3]_2 \quad (II)$$

in which R$^1$ is halogen or an organic group selected from the group consisting of alkyl, alkenyl, amino, mercapto, acetoxy, epoxy, methacryloxy and N'-acyl urea which is bound to the silicon atom by an alkyl chain which has 2 to 6 carbon atoms, R is an alkyl group which contains 1 to 4 carbon atoms and x signifies a number from 1 to 6, the organosilane content being 0.01 to 10% by weight relative to the fibers.

2. Aramid fibers as set forth in claim 1 in which R$^1$ is selected from chlorine, methyl, ethyl with n=2, vinylene, 2-propenyl, cyclohexenyl, N'-acyl urea of the formula:

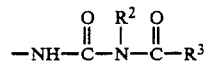

where R$^2$ is straight-chain or branched-chain alkyl containing 1 to 6 carbon atoms, R$^3$ is hydrogen, straight-chain or branched chain alkyl containing 1 to 6 carbon atoms, (2-methoxy)ethyl, aryl or

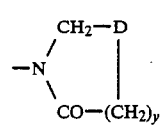

where y=1, 2 or 3 and D is —CH$_2$— or NR$^2$.

* * * * *